(12) United States Patent
Murano et al.

(10) Patent No.: US 9,476,574 B2
(45) Date of Patent: Oct. 25, 2016

(54) FASTENING DEVICE, IN PARTICULAR FOR LIGHTING DEVICES

(71) Applicant: Michael A. Kozuschek, San Luis Obispo, CA (US)

(72) Inventors: Aaron Murano, San Luis Obispo, CA (US); Terry Cooke, San Luis Obispo, CA (US); James Fortner, San Luis Obispo, CA (US)

(73) Assignee: Michael A. Kozuschek, San Luis Obispo, CA (US)

( * ) Notice: Subject to any disclaimer, the term of this patent is extended or adjusted under 35 U.S.C. 154(b) by 0 days.

(21) Appl. No.: 13/840,439

(22) Filed: Mar. 15, 2013

(65) Prior Publication Data

US 2014/0268710 A1    Sep. 18, 2014

(51) Int. Cl.
*B62J 6/00* (2006.01)
*F21V 33/00* (2006.01)
(Continued)

(52) U.S. Cl.
CPC .............. *F21V 21/088* (2013.01); *F16B 2/22* (2013.01); *F21L 4/00* (2013.01); *F16B 2/08* (2013.01); *F21L 15/14* (2013.01); *F21V 21/0816* (2013.01); *F21V 21/0885* (2013.01)

(58) Field of Classification Search
CPC .............. B62J 6/02; B62J 6/04; B62J 11/00; F16B 2/08; F16B 2/22; F16B 2/205; F21V 21/088; F21V 21/0885; F21V 21/0816; F21V 21/0832; F21L 15/14; Y10T 24/314; Y10T 24/44017; Y10T 24/44231; Y10T 24/316; Y10T 24/318; Y10T 24/2185; Y10T 24/2117; Y10T 24/4047; Y10T 24/4077; Y10T 24/45204; Y10T 24/4755; Y10T 24/4745; Y10T 24/1498; F16L 3/137; F16L 3/138
USPC ....... 362/475, 476, 103, 105, 106, 474, 387, 362/396, 431; 248/693, 634, 74.3, 104, 248/214, 230.8; 40/660, 665, 607.14; 24/30.5 R, 379.1, 114.5, 457, 481, 482, 24/570, 265 CD, 464, 465, 477, 478, 479, 24/470, 472, 68 A, 68 D, 68 PP, 483, 489, 24/546; 224/250, 493, 42.39, 148.6, 578, 224/160, 175
See application file for complete search history.

(56) References Cited

U.S. PATENT DOCUMENTS 67,393 A  * 7/1867 Wright ....................... 24/30.5 R
4,170,337 A   10/1979 Davis
(Continued)

FOREIGN PATENT DOCUMENTS

EP    1010380    3/2003

OTHER PUBLICATIONS

Extended European Search Report for 13172164.9 mailed from the European Patent Office on May 15, 2014.
(Continued)

*Primary Examiner* — Evan Dzierzynski
*Assistant Examiner* — James Endo
(74) *Attorney, Agent, or Firm* — Fitch, Even, Tabin & Flannery LLP

(57) ABSTRACT

A fastening device includes a clip 14 with a first clip member 22 and a second clip member 24. The second clip member 24 is resiliently pivotable relative to the first clip member 24, such that a flat object may be resiliently clamped between the first and second clip members 22, 24. The clip 14 has a strap holding portion 30, where a first end of a flexible strap 16 is held within the strap holding portion 30. The clip 14 further has a strap receiving portion 32 arranged at a distance from the strap holding portion 30. The strap receiving portion is shaped to receive a portion of the strap. By use of the fastening device, an element, and in particular a lighting device 12, may be alternatively fixed to another element by the flexible strap 16 or may engage a flat object within the clip 14.

10 Claims, 3 Drawing Sheets

(51) Int. Cl.
*F21V 21/088* (2006.01)
*F16B 2/22* (2006.01)
*F21L 4/00* (2006.01)
*F21V 21/08* (2006.01)
*F16B 2/08* (2006.01)

(56) References Cited

U.S. PATENT DOCUMENTS

| | | | | |
|---|---|---|---|---|
| 5,181,774 | A * | 1/1993 | Lane | 362/549 |
| 5,325,568 | A * | 7/1994 | Bruhm | 24/301 |
| 5,436,810 | A * | 7/1995 | Sutherland et al. | 362/473 |
| 5,778,583 | A * | 7/1998 | Larsen | 40/637 |
| 6,206,543 | B1 | 3/2001 | Henry | |
| 6,553,634 | B2 * | 4/2003 | Ogawa | 24/339 |
| 6,618,906 | B2 * | 9/2003 | Ciesiun | 24/3.12 |
| 6,749,166 | B2 * | 6/2004 | Valentine | F16M 11/40 24/115 H |
| 7,070,295 | B1 * | 7/2006 | Lee | 362/191 |
| 7,857,478 | B1 * | 12/2010 | Keller | 362/103 |
| 8,070,027 | B2 * | 12/2011 | Piatt, Sr. | A45F 5/02 224/250 |
| 8,360,597 | B1 | 1/2013 | Hanchett | |
| 2003/0021105 | A1 * | 1/2003 | Cramer | F21L 14/00 362/105 |
| 2003/0041416 | A1 * | 3/2003 | D'Addario | F16L 3/233 24/15 |
| 2003/0106919 | A1 * | 6/2003 | Chuang | 224/420 |
| 2003/0137850 | A1 * | 7/2003 | Liaw et al. | 362/474 |
| 2006/0120066 | A1 * | 6/2006 | Huang | 362/105 |
| 2007/0011850 | A1 * | 1/2007 | Downing | A41F 9/007 24/16 R |
| 2007/0247858 | A1 * | 10/2007 | Ford | 362/382 |
| 2009/0268436 | A1 * | 10/2009 | Taiga | B62J 6/00 362/158 |
| 2009/0269156 | A1 * | 10/2009 | Siegenthaler | 410/116 |
| 2010/0254123 | A1 * | 10/2010 | Brown | 362/191 |
| 2012/0170295 | A1 * | 7/2012 | Ellenburg | B62J 11/00 362/473 |
| 2012/0218771 | A1 * | 8/2012 | Yen | 362/473 |
| 2012/0292480 | A1 * | 11/2012 | Burley | B62B 9/26 248/674 |

OTHER PUBLICATIONS

Cat Eye Loop SL-LD 110 LED Security Light; Bike 24; http://translate.google.com/translate?hl=en&sl=de&u=http://www.bike24.de/p113717.html; downloaded Jun. 5, 2013.
Perfect 3-Level Adjustment Torch Flashlight Handlebar Mount Holder Bracket for Bicycle (Black); http://www.iaminthestore.com/media/catalog/product/cache/1/image/dca5db; downloaded Apr. 3, 2013.
Profex Silikonleuchtenset LED; http://www.wunschpreisalarm.de/plprofex-silikonleuchtenset-led-rot; downloaded Jun. 10, 2013.
RFR LED Front Clip Light; Cube Lights; http://www.cube.eu/en/equipment/accessory/lights/product/rfr-led-front-clip-light-1/; downloaded Apr. 3, 2013.
Rubber Stand Holder for Bicycle Flashlight Bike Black; Ralplurk; http://ralplurk.info/rubber-stand-holder-for-bicycle-flashlight-bike-light-black.htm; downloaded Apr. 3, 2013.
Talon-Like Basement; Magicshine MJ-880 Y rubber; PDA Max; https://translate.googleusercontent.com/translate_c?depth=1&hl=en&ie+UTF8&prev=_t&rurl; downloaded Jun. 5, 2013.

* cited by examiner

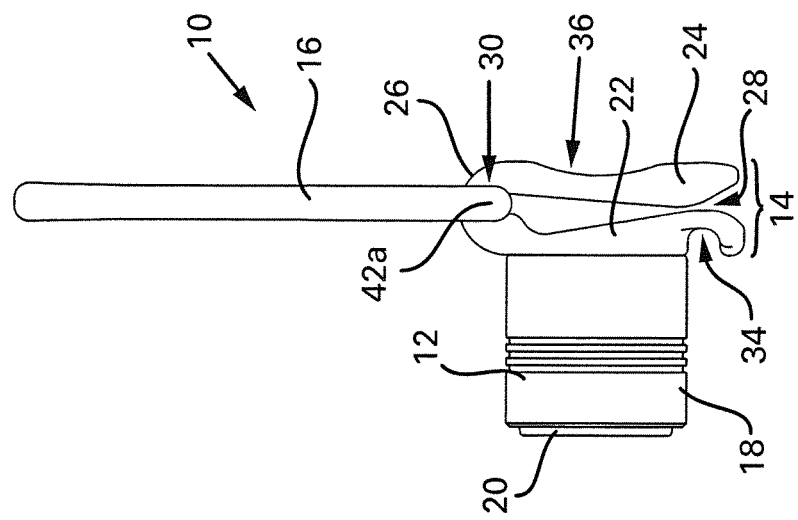
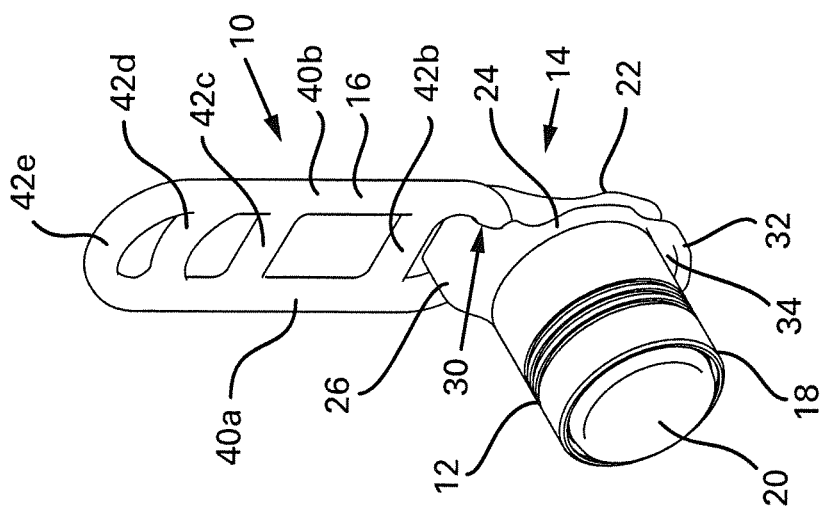

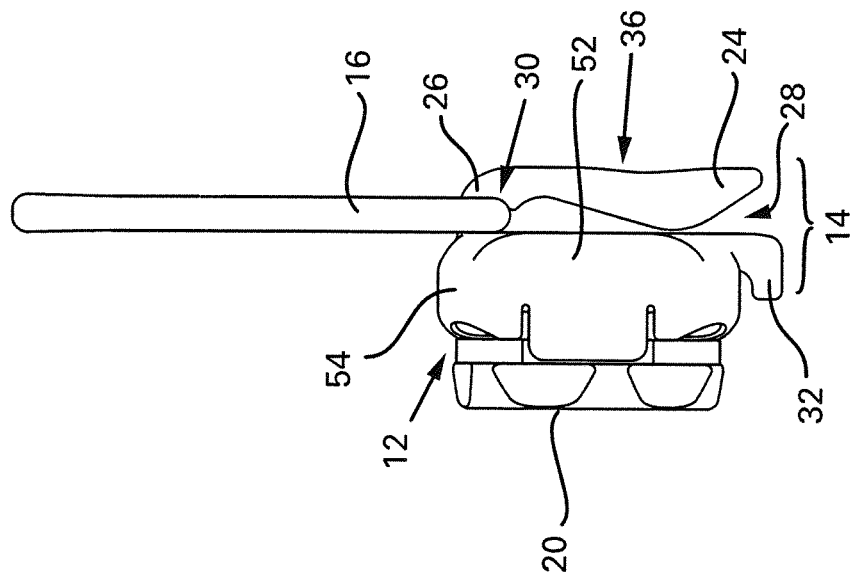
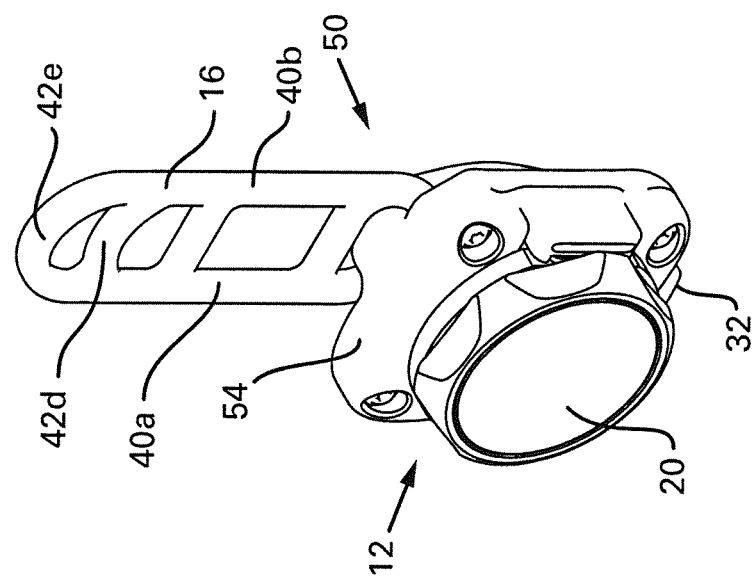

FASTENING DEVICE, IN PARTICULAR FOR LIGHTING DEVICES

FIELD OF THE INVENTION

The present invention relates to a fastening device, and in particular to a fastening device for a lighting device.

BACKGROUND OF THE INVENTION

Numerous types of fastening devices are known, usable to fasten one object to another.

U.S. Pat. No. 8,360,597 discloses a light mounting apparatus including suitable connection structures to a light source in order to allow multiple degrees of freedom to allow for versatile usage. A light source may be attached via a bracket assembly.

EP 1 010 380 B1 describes a multi-attachment device for use on backpacks, including a base which may be attached to a strap and a releasable catch mechanism. A variety of implement holders can be attached to the base.

It may be considered an object of the invention to provide a fastening device and lighting arrangement allowing flexible fastening.

SUMMARY OF THE INVENTION

According to an aspect of the invention, the fastening device includes a clip with a first and second clip member. The clip may serve to clamp an object resiliently between the clip members. To allow this, the clip members may be resiliently separable, e.g. at least the second clip member may be resiliently pivotable relative to the first clip member. This may be achieved e.g. by a joint provided between the clip members with a spring element biasing the second clip member towards the first clip member. Preferably the resilient clamping is achieved by providing at least a portion of the first or second clip member, or a connection portion between the first and second clip member, to be flexible.

According to one aspect, the fastening device further comprises a flexible strap. The clip may comprise a strap holding portion, where a first portion of the flexible strap is held within the strap holding portion. The holding portion may advantageously be shaped to at least partially surround the first portion of the strap. In particular, it is preferred to provide the strap holding portion to surround the strap for more than 180 degrees around a circumference thereof, so that the first portion of the strap is held in the strap holding portion in form-fitting manner.

According to a further aspect, the clip further comprises a strap receiving portion. The strap receiving portion may be arranged at distance from the strap holding portion. The strap receiving portion may be shaped to receive a second portion of the strap, which is distant from the first portion.

In a preferred example, the strap receiving portion may be provided hook-shaped to engage the second portion of the strap.

By providing a strap holding portion and a strap receiving portion at a distance, it is possible to fasten the device to another object such as a tube, bar etc. by bending the flexible strap around the object and then engaging the second strap portion with the strap receiving portion. Due to the flexible properties of the strap, it may be bent around the object under tension force and can thus be received e.g. in a hook-shaped receiving portion.

Alternatively, the fastening device may be fixed to another object by clamping within the clip.

The fastening device according to the invention is thus very flexible and may be fastened to different objects.

The fastening device may advantageously be used for a plurality of items, and in particular for bicycle accessories. An example of an item which may be fastened by the fastening device is a reflector which reflects light and allows better visibility at night time, and which may be fastened e.g. to a bicycle by the strap or to a backpack by the clip. As will become apparent in connection with preferred embodiments, it is particularly preferred to use the fastening device for a lighting device, which may alternatively be fastened to a part of a vehicle, such as e.g. a bar or tube of a bicycle by using the strap, or to a flat object, such as a textile article, an article of clothing, a belt, bag etc. by using the clip.

According to a preferred embodiment of the invention, the first and second clip members may be formed integrally in one piece. In particular, the clip including the first and second clip members may be made in one piece out of plastic material, but other materials are possible that provide a sufficient degree of elasticity. The shape and material will thus be chosen to allow the required flexibility for resilient clamping.

According to one embodiment, the strap holding portion is provided between the first and second clip members. In particular, it is preferred to provide the strap holding portion at a connecting portion which connects the first and second clip member, in particular arranged opposite to the opening between the first and second clip members. In this connecting portion, the strap may be securely held, while the length of the clip members may serve to provide a distance between the strap holding portion and strap receiving portion.

According to a preferred embodiment of the invention, the second clip member may comprise a portion of concave shape. The receiving portion is preferably arranged on the back surface of the second clip member i.e. opposite to the surface of the second clip member facing the first clip member. The receiving portion allows to accommodate a tube, bar or other object to which the fastening device may be fastened with the strap. The concave shape is preferably rounded so that the fastening device may be attached to an object of round, e.g. circular shape by the strap, in particular to a tube or bar of a bicycle.

According to a preferred aspect, the strap may be of elongate shape and may comprise at least two longitudinal bars arranged at a distance from each other. The longitudinal bars of the strap may be arranged at least substantially in parallel. Further, at least a first and a second traverse bar may be provided connecting the longitudinal bars of the strap. The traverse bars may extend straight, e.g. at right angles to the longitudinal bars. Alternatively, the traverse bars may have bent shape.

A first traverse bar may be used to fix the strap to the clip by providing the first traverse bar to be received within the strap holding portion. Further, the strap receiving portion may be shaped to receive a second traverse bar.

The strap may comprise further traverse bars, e.g. to have at least three or more traverse bars, so that different traverse bars may be used to engage the strap receiving portion, and the fastening device may thus be fastened to objects such as tubes and bars of different diameter.

The strap may be made out of suitable flexible materials, e.g. rubber, silicone etc. It is preferred to provide the strap including the above described longitudinal and traverse bars in one piece.

According to an aspect, a lighting assembly is provided including a lighting device and a fastening device as describe above. The lighting device may e.g. comprise a battery, which may be rechargeable, and an electric light source, such as one or more light emitting diodes (LED).

In one embodiment, it is preferred to provide the clip integrally formed with a housing of the lighting device.

These and other aspects of the invention will become apparent from and elucidated with reference to the embodiments describe herein after.

BRIEF DESCRIPTION OF THE DRAWINGS

FIG. 1 shows a perspective view of a lighting assembly including a lighting device and a fastening device according to a first embodiment;

FIG. 2 shows a side-view of the assembly of FIG. 1;

FIG. 4 shows a perspective view of a lighting assembly according to a second embodiment;

FIG. 5 shows a side-view of the assembly according to FIG. 4.

DETAILED DESCRIPTION OF PREFERRED EMBODIMENTS

Figure 3:
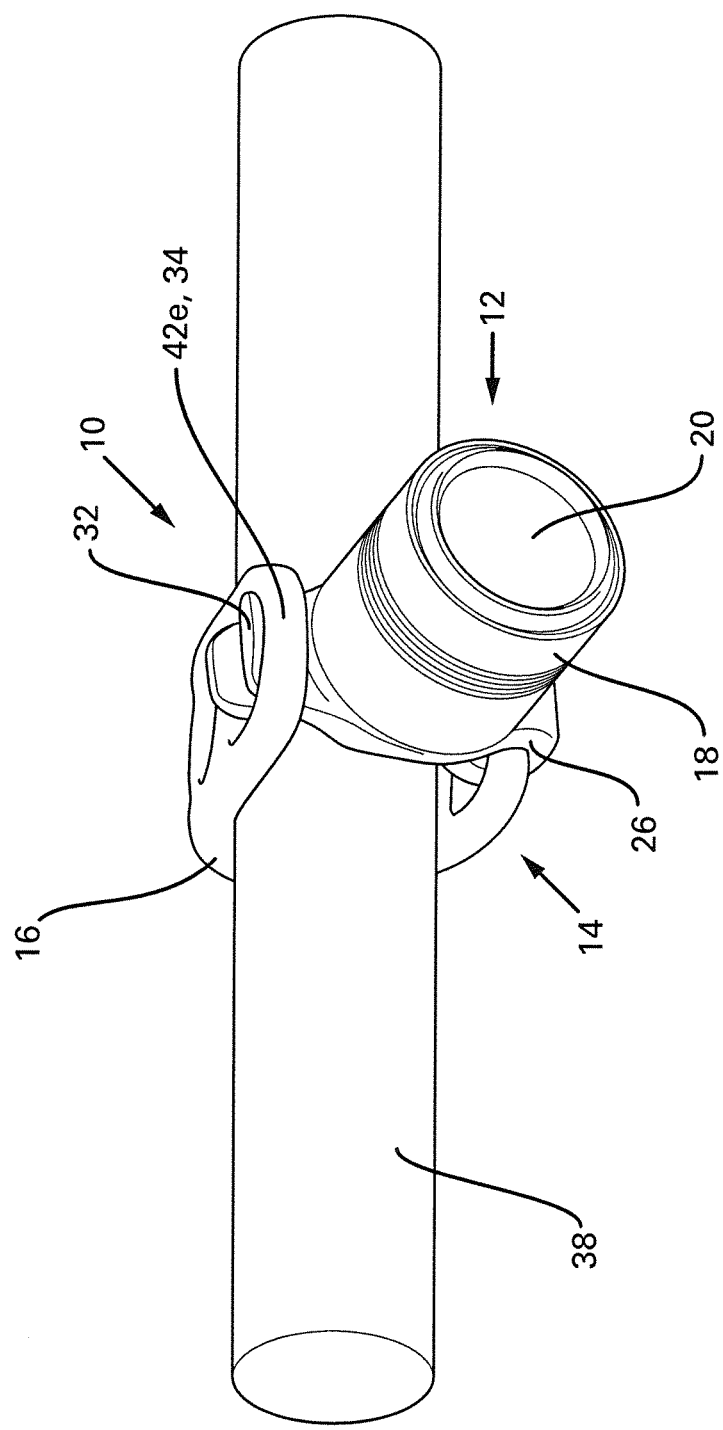
FIG. 3 shows a perspective view of the assembly of FIG. 1, FIG. 2 mounted on a tube.

FIG. 1 shows in a perspective view an embodiment of a lighting assembly 10 including a lighting device 12, a clip 14 and a flexible strap 16.

As will be explained, the lighting assembly 10 may be used as a bicycle light, where the lighting device 12 may be fixed to a tube, bar or other part of a bicycle by means of the flexible strap 16, e.g. as shown in FIG. 3. Alternatively, the lighting assembly 10 may also be attached to an article of clothing, belt, a bag etc. by using the clip 14.

In the first embodiment of a lighting assembly 10 as shown in FIGS. 1-3, the actual lighting device 12 comprises a housing 18, in this example of circular cylindrical shape and made out of aluminium. Arranged at the front side of the housing 18 is a reflector 20 with an LED-element (not shown) behind a transparent cover. Within the housing 18, a battery is arranged. The transparent cover of the reflector 20 is axially movable against a spring (not shown) to serve as an on/off push button to activate or deactivate the LED-element.

The clip 14 is made of a single piece of plastic and comprises two clip members 22, 24 oriented roughly in parallel, of which a first clip member 22 has an integrally formed fixing portion of cylindrical shape partially projecting into the housing 18. In this way, the lighting device 12 is fixed to the first clip member 22. The clip 14 further comprises a second clip member 24 connected to the first clip member 22 by a connecting portion 26.

As explained, the entire clip 14 is made out of a plastic material in one piece. Due to the elastic properties of the material, the second clip member 24 is resiliently pivotable with respect to the first clip member 22. Thus, with the application of an opening force, the clip 14 may be opened at an opening 28 such that the ends of the first and second clip members 22, 24 are forced apart. A flat object, e.g. a belt, textile article etc. may be inserted in the opening 28 of the clip 14 and be clamped between the first and second clip members 22, 24.

Further, the flexible strap 16 is attached to the clip 14. The connecting portion 26 between the first and second clip members 22, 24 forms an inner cavity acting as a strap holding portion 30. The strap holding portion 30 surrounds the flexible strap 16 around more than 180°, and close to 240° around its circumference, and therefore grips the flexible strap 16 in form-fitting manner. The flexible strap 16 may only be removed from the strap holding portion 30 by compressing the flexible material thereof. Thus, the flexible strap 16 will not be accidentally detached from the clip 14.

At the opposite end of the clip 14, a hook-shaped end of the first clip member 22 forms a strap receiving portion 32. As shown, the strap receiving portion 32 forms a partially enclosed cavity 34 which may receive a portion of the flexible strap 16.

The second clip member 24 comprises on its back surface, i.e. facing away from the first clip member 22, a concave bent receiving portion 36. Thus, if the lighting assembly 10 is attached to a tube 38 (FIG. 3), the tube 38 will contact the receiving portion 36, and the bent rounded shape will provide a firm contact.

The flexible strap 16, as shown in FIG. 1, is formed out of one piece of a flexible material, such as rubber, silicone, etc. It comprises two longitudinal bars 40a, 40b arranged in parallel and connected by five traverse bars 42a, 42b, 42c, 42d, 42e connecting the longitudinal bars 40a, 40b. A first traverse bar 42a is received in the strap holding portion 30.

As the lighting assembly 10 is attached to a tube 38 as shown in FIG. 3, the flexible strap 16 is bent around the tube 38. The strap fixed to the clip 14 by the first traverse bar 42a received within the strap holding portion 30 is engaged at its opposite end with a fifth traverse bar 42e received within the partially enclosed cavity 34 of the strap receiving portion 32. Thus, the flexible strap 16 is bent around the tube 38 under tension, and thus attaches the clip 14 to the tube 38.

The lighting assembly 10 may be fixed to tubes of different diameter by engaging other traverse bars 42c, 42d with the strap receiving portion 32.

FIG. 4 shows a second embodiment of a lighting assembly 50. The second embodiment resembles in many details the first embodiment, so that in the following only significant differences will be explained, and like parts will be designated by like reference numerals.

The lighting assembly 50 as shown in FIG. 4, FIG. 5 comprises a clip 14, where the second clip member 24, the receiving portion 36 and the strap holding portion 30 have a similar shape as in the first embodiment. However, the clip 14 comprises a first clip member 52 integrally formed with a back portion of a housing 54 of the lighting device 12. Thus, the partial housing 54 is integrally formed as one piece of plastic material with the second clip member 24 and connecting portion 26 as well as with the strap receiving portion 32, which is again provided in a hook-shape, with the hook element facing away from the end of the second clip member 24.

In the second embodiment, the lighting element 12 comprises a rechargeable battery. The housing 54 comprises a charging connector to charge the battery (not shown).

While the invention has been illustrated and described in detail in the drawings and foregoing description, such illustration and description are to be considered illustrative or exemplary and not restrictive; the invention is not limited to the disclosed embodiments.

Variations from the disclosed embodiments can be understood and effected by those skilled in the art in practicing the claimed invention, from a study of the drawings, the disclosure and the appended claims. In the claims, the word "comprising" does not exclude other elements, and the indefinite articles "a" and/or "an" do not exclude a plurality.

The mere fact that certain measures are recited in mutually different dependent claims does not indicate that a combination of these measures cannot be used to advantage. Any reference signs in the claims should not be construed as limiting the scope.

The invention claimed is:

1. A lighting device for fastening to an object comprising:
   a clip with a first clip member, a second clip member, and a connection portion between the first clip member and the second clip member and connecting the first clip member to the second clip member, where said second clip member is resiliently pivotable relative to said first clip member such that a flat object may be resiliently clamped between the first clip member and the second clip member,
   wherein the connection portion forms an inner cavity between the first clip member and the second clip member, the second clip member including a concave object receiving portion on a back surface facing away from the first clip member, the concave object receiving portion configured to accommodate the object;
   a flexible strap including at least two longitudinal bars arranged in parallel and connected by at least two traverse bars, wherein a first traverse bar is received within the inner cavity, whereby the connection portion grips the first traverse bar in a form-fitting manner, wherein said first clip member further comprises a strap receiving portion on a front surface facing away from the second clip member arranged at a distance from the inner cavity, whereby the device is configured to fasten to the object by first bending the flexible strap around the object that is on the back surface of the second clip member and subsequently engaging a second traverse bar of the flexible strap in the strap receiving portion such that the flexible strap is bent around the object under tension force; and
   a fixing portion comprises a lighting device fixed to the first clip member, wherein the lighting device comprises at least a battery and an electric light source.

2. The lighting device according to claim 1, wherein said first clip member and said second clip member are formed integrally in one piece.

3. The lighting device according to claim 1, wherein said inner cavity is shaped to surround the flexible strap around more than 180°.

4. The lighting device according to claim 1, the fixing portion further configured to mount said lighting device, wherein an inner surface of said first clip member is arranged between said fixing portion and said second clip member.

5. The lighting device according to claim 4, wherein said fixing portion is a part of a housing of said lighting device.

6. The lighting device according to claim 1, wherein at least three traverse bars are provided connecting said at least two longitudinal bars.

7. The lighting device according to claim 1, wherein said strap receiving portion is provided hook-shaped, the open side of the strap receiving portion facing away from said second clip member.

8. The lighting device according to claim 1, wherein said lighting device is coupled to the clip.

9. The lighting device according to claim 8, wherein said clip is integrally formed with a housing at least partially surrounding said lighting device.

10. A method for fastening a lighting device to an object, comprising the steps of:
   contacting of the object to a clip comprising a first clip member, a second clip member a fixing portion comprising the lighting device fixed to the first clip member, wherein the lighting device comprises at least a battery and an electric light source, and a connection portion between the first clip member and the second clip member and connecting the first clip member to the second clip member, wherein the connection portion forms an inner cavity between the first clip member and the second clip member, and wherein the contacting of the object to the clip comprises the object contacting an object receiving portion of the second clip member on a back surface facing away from the first clip member;
   bending, after contacting the object receiving portion, of a flexible strap around the object, a first portion of the flexible strap held in the inner cavity of the clip, wherein the first clip member comprises a strap receiving portion on a front surface facing away from the second clip member arranged at a distance from the inner cavity, the strap receiving portion being shaped to receive a second portion of said flexible strap distant from said first portion of said flexible strap,
   receiving, after bending of the strap, of the second portion of the flexible strap in the strap receiving portion of the first clip member, wherein the second clip member is interposed between the first clip member and the object, whereby the second clip member is clamped to the first clip member.

* * * * *

UNITED STATES PATENT AND TRADEMARK OFFICE
CERTIFICATE OF CORRECTION

PATENT NO.       : 9,476,574 B2
APPLICATION NO.  : 13/840439
DATED            : October 25, 2016
INVENTOR(S)      : Murano et al.

It is certified that error appears in the above-identified patent and that said Letters Patent is hereby corrected as shown below:

In the Claims
Claim 10, Column 6, Line 20, delete "member a" and insert --member, a--.

Signed and Sealed this
Seventh Day of February, 2017

Michelle K. Lee
*Director of the United States Patent and Trademark Office*